United States Patent
Kim et al.

(10) Patent No.: US 7,219,207 B2
(45) Date of Patent: May 15, 2007

(54) RECONFIGURABLE TRACE CACHE

(75) Inventors: Sangwook Kim, Austin, TX (US);
Dhananjay Adhikari, Austin, TX (US);
Adi Yoaz, Austin, TX (US)

(73) Assignee: Intel Corporation, Santa Clara, CA (US)

(*) Notice: Subject to any disclaimer, the term of this patent is extended or adjusted under 35 U.S.C. 154(b) by 487 days.

(21) Appl. No.: 10/726,838

(22) Filed: Dec. 3, 2003

(65) Prior Publication Data
US 2005/0125613 A1   Jun. 9, 2005

(51) Int. Cl.
*G06F 12/00* (2006.01)
(52) U.S. Cl. .................................................. 711/170
(58) Field of Classification Search ............... 711/118, 711/170; 713/100
See application file for complete search history.

(56) References Cited

U.S. PATENT DOCUMENTS

| 5,727,208 A * | 3/1998 | Brown ........................ 713/100 |
| 5,867,422 A * | 2/1999 | John ........................... 365/168 |
| 6,684,298 B1 * | 1/2004 | Dwarkadas et al. ......... 711/128 |
| 6,782,550 B1 * | 8/2004 | Cao ............................. 725/39 |
| 2004/0111708 A1 * | 6/2004 | Calder et al. ................ 717/131 |

* cited by examiner

*Primary Examiner*—Hiep T. Nguyen
(74) *Attorney, Agent, or Firm*—Blakely, Sokoloff, Taylor & Zafman LLP

(57) ABSTRACT

According to one embodiment a computer system is disclosed. The computer system includes a microprocessor and a chipset coupled to the microprocessor. The microprocessor removes stale branch instructions prior to the execution of a first cache line by finding existing branch prediction data for the first cache line.

19 Claims, 5 Drawing Sheets

RECONFIGURABLE TRACE CACHE

FIELD OF THE INVENTION

The present invention relates to computer systems; more particularly, the present invention relates to central processing units (CPUs).

BACKGROUND

In high-performance, superscalar microprocessors, a decoded instruction cache (or trace cache) is used to improve performance. This type of instruction cache improves the bandwidth, throughput, and latency of "fetch" and "decode" portions of microprocessors by quickly sending packets of decoded macro-instructions (called micro-operations) into the core of the microprocessor. At the end of the pipeline that fetches and decodes macro instructions, the micro-operations are typically assembled into packets and written into a trace cache on their way into an allocation pipeline.

For many applications, the trace cache performance is strongly correlated to hit rate. Large trace cache arrays provide high hit rates but consume a great deal of power. General-purpose applications exhibit different size requirements on the trace cache for realizing their performance benefits. Some applications require only a small size.

However for others, the performance continues to improve as the size is increased. If the trace cache is larger than is needed for a given application to achieve an acceptable level of performance, the over allocation of cache resources will consume unnecessary power. If the trace cache is too small, the application may not achieve an acceptable level of performance. Additional resources can be added to improve the performance. However, increased power consumption may degrade the performance benefit.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

A reconfigurable trace cache (RTC) described. In one embodiment, a RTC can be dynamically reconfigured for each application requirement, to reduce power consumption or to improve performance. In a further embodiment, a RTC uses profile techniques to guide the reconfiguration of cache structures. For applications that require a smaller size, profile hints are provided to the RTC for disabling parts of the cache arrays to reduce unnecessary power consumption. For other resource hungry applications, the RTC uses a temporal-based indexing technique to improve performance without requiring a significant amount of hardware resources.

In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
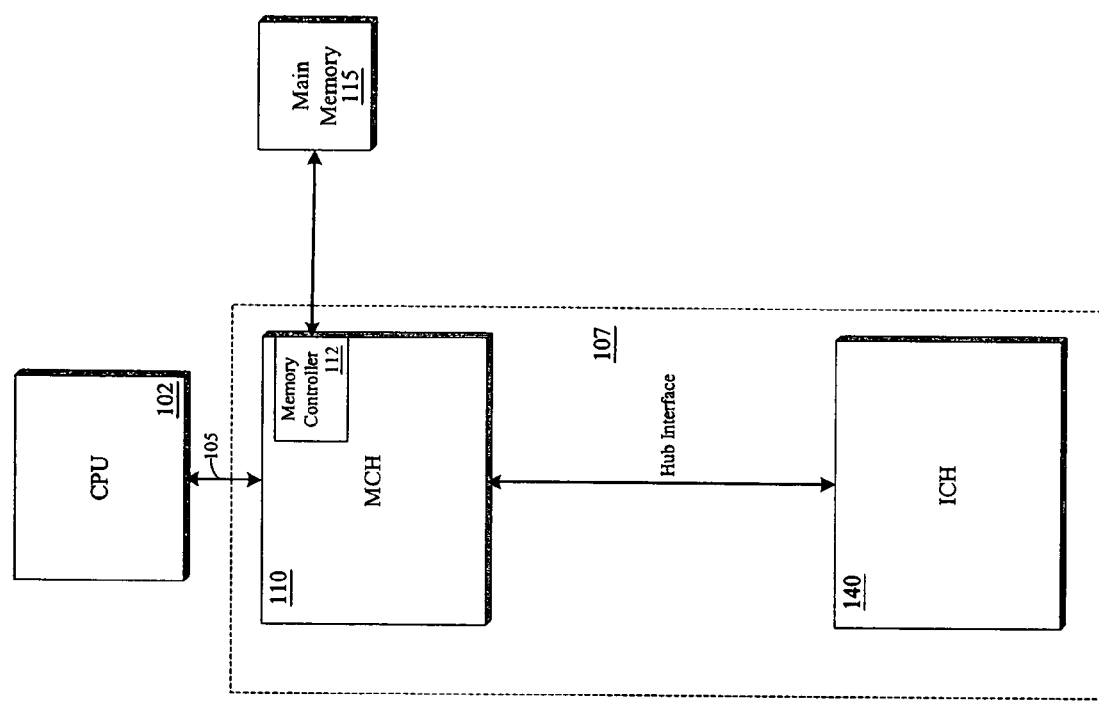
FIG. 1 illustrates one embodiment of a computer system.

FIG. 1 is a block diagram of one embodiment of a computer system 100. Computer system 100 includes a central processing unit (CPU) 102 coupled to bus 105. In one embodiment, CPU 102 is a processor in the Pentium® family of processors including the Pentium® II processor family, Pentium® III processors, and Pentium® IV processors available from Intel Corporation of Santa Clara, Calif. Alternatively, other CPUs may be used.

A chipset 107 is also coupled to bus 105. Chipset 107 includes a memory control hub (MCH) 110. MCH 110 may include a memory controller 112 that is coupled to a main system memory 115. Main system memory 115 stores data and sequences of instructions and code represented by data signals that may be executed by CPU 102 or any other device included in system 100.

In one embodiment, main system memory 115 includes dynamic random access memory (DRAM); however, main system memory 115 may be implemented using other memory types. Additional devices may also be coupled to bus 105, such as multiple CPUs and/or multiple system memories.

In one embodiment, MCH 110 is coupled to an input/output control hub (ICH) 140 via a hub interface. ICH 140 provides an interface to input/output (I/O) devices within computer system 100. For instance, ICH 140 may be coupled to a Peripheral Array Interconnect bus adhering to a Specification Revision 2.1 bus developed by the PCI Special Interest Group of Portland, Oreg.

Figure 2:
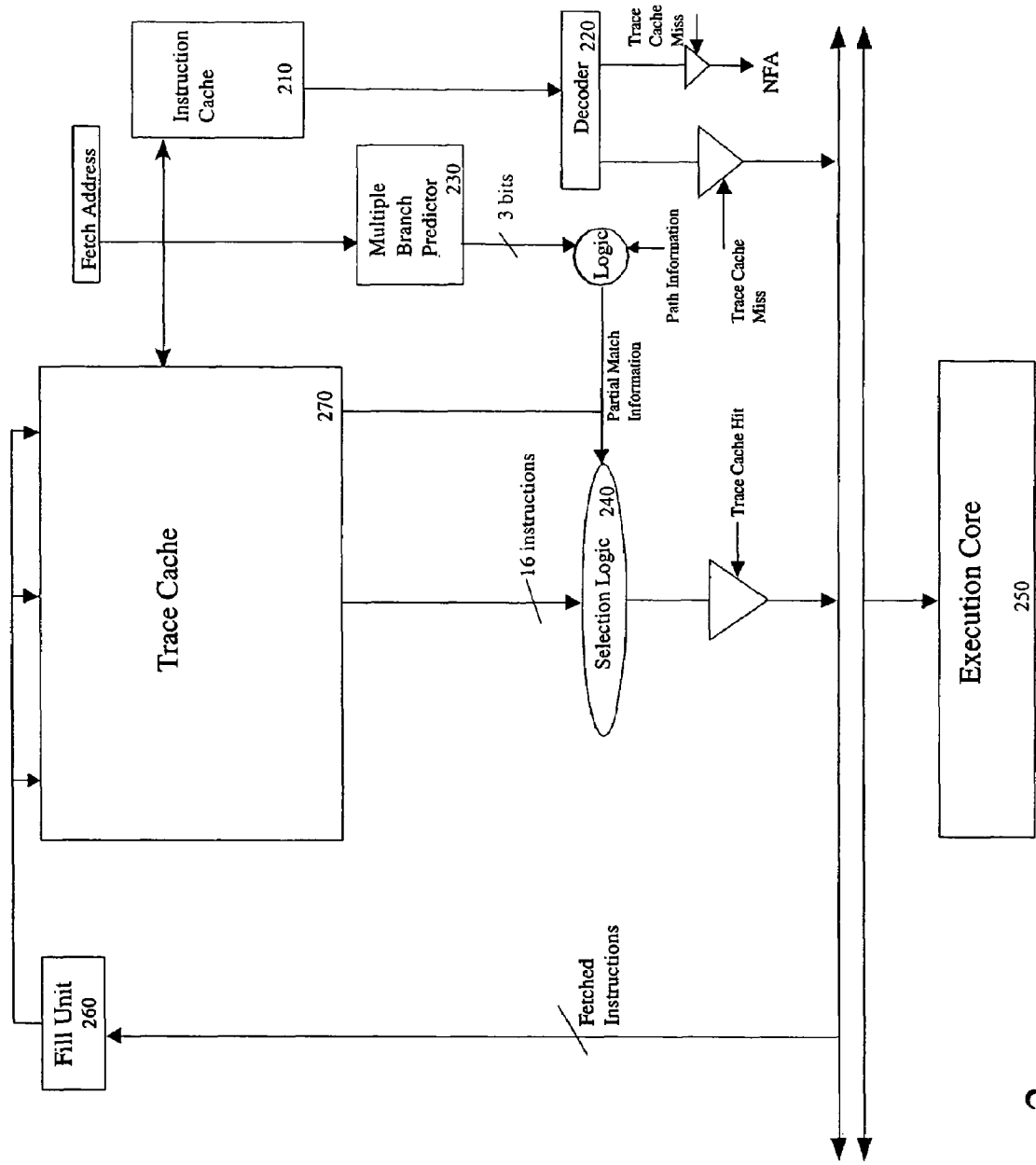
FIG. 2 illustrates one embodiment of a central processing unit.

FIG. 2 illustrates one embodiment of CPU 102. CPU 102 includes an instruction cache 210, decoder 220, multiple branch predictor 230, selection logic 240, execution core 250, fill unit 260 and trace cache 270. Instruction cache 210 stores instructions that are to be executed at execution core 250. Decoder 220 is coupled to instruction cache 210, and is implemented to decode instructions received from instruction cache 210.

Multiple branch predictor 230 predicts branches that are to be executed. Selection logic 240 selects data that is to be transmitted from trace cache 270. Execution core 250 performs allocation, execution, retirement and branch update services on received micro-operations. Fill unit 260 forms traces from instructions received from instruction cache 210. Trace cache 270 stores instruction traces. In one embodiment, a trace is a set of dynamically formed, logically contiguous decoded-instruction blocks.

Figure 3:
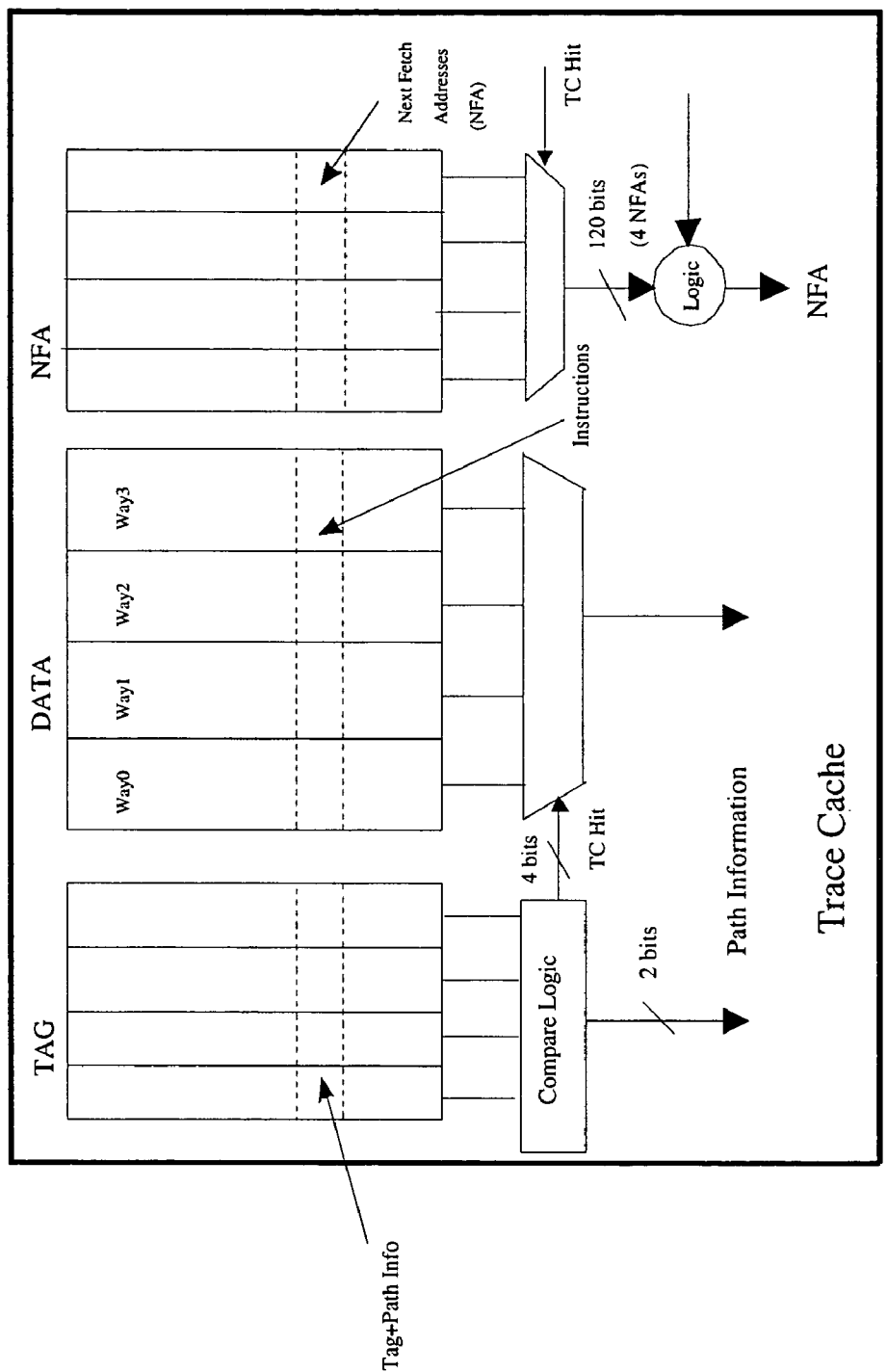
FIG. 3 illustrates an exemplary trace cache.

FIG. 3 illustrates an exemplary trace cache. The trace cache includes a tag array, a data array and a next fetch address (NFA) array. The tag, data and NFA arrays each include way entries. During operation of the conventional trace cache mechanism, a next fetch address unit generates fetch addresses and the multiple branch predictor 230 predicts multiple branches per access. Both the trace cache and instruction cache 210 are accessed simultaneously.

If there is a hit detected in the trace cache, a trace is fetched with internal branch path information within the fetched trace. The multiple branch predictor 230 provides the current prediction information to the selection logic 240 to check with the internal branch information. If matched, the entire trace is fetched to the execution core 250.

If a part of the trace is matched, the matching part of the trace is fetched. The fill unit 260 forms a trace by collecting fetched instructions either from the trace cache or the instruction cache 210. To form a trace, instructions are collected into a buffer until the fill unit finalizes the trace. The finalized trace is written to the trace cache if it is not already present in the cache. Typically, the trace is finalized when the trace includes 16 instructions, 3 conditional branches, a single indirect branch, return, or trap instruction, or merging the incoming block of instructions would result in a trace that is larger than 16 instructions.

However as discussed above, some applications require only a small size trace cache, while others require a cache with an increased size. If the trace cache is larger than is needed for a given application to achieve an acceptable level of performance, the over allocation of cache resources will consume unnecessary power. If the trace cache is too small, the application may not achieve an acceptable level of performance.

Figure 4:
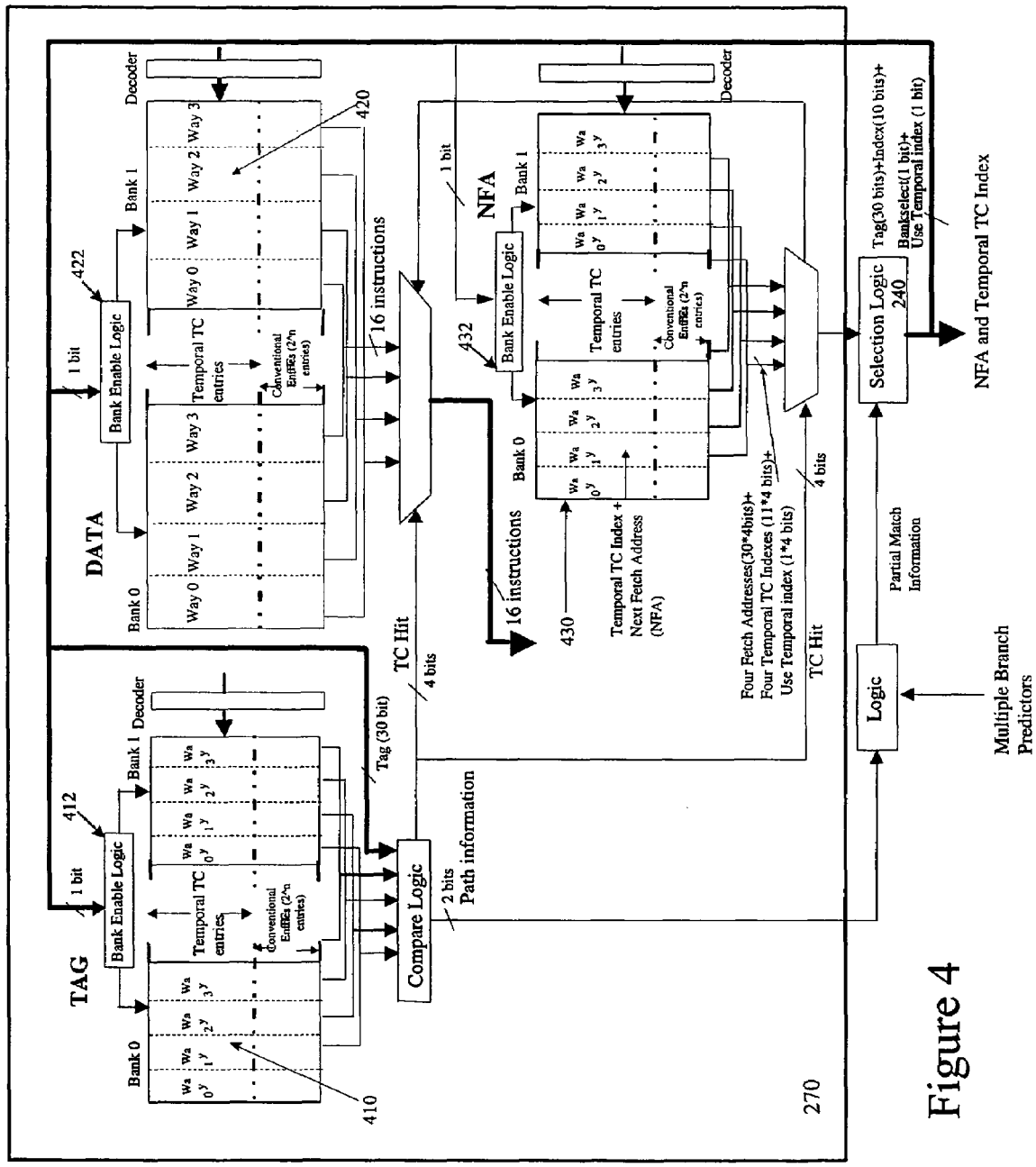
FIG. 4 illustrates one embodiment of a reconfigurable trace cache.

According to one embodiment, trace cache 270 is a RTC that can be dynamically reconfigured to meet the performance requirement of various applications without wasting unnecessary power. FIG. 4 illustrates one embodiment of trace cache 270 implementing a RTC. Trace cache 270 includes a tag array 410, a data array 420 and a next fetch address (NFA) array 430.

According to one embodiment, each cache array is divided into two banks having a multitude of ways. In a further embodiment, each way within the cache arrays stores conventional trace cache entries and temporal trace cache entries. The temporal entries implement a temporal-based indexing technique that directly maps traces to the cache entries for reducing conflict misses. In one embodiment, each selected trace is assigned with an index to the cache entry.

For the temporal-based indexing technique, trace cache 270 uses temporal indexes to access the cache arrays for selected traces. The temporal indexes are generated by the profile technique and communicated through branch ISA. When the fill unit forms a trace, the temporal index is extracted from the first branch in the trace.

This index is used to allocate entries in trace cache 270 structures instead of a part of the fetch address of the trace. However, if there is no valid temporal index generated for the trace, the fetch address is used. If the profile information is representative of real data, only infrequently-occurring traces will use these entries. Entries that are accessed using temporal indexes are named temporal trace cache entries.

In one embodiment, NFA array 430 caches all temporal indexes in addition to fetch addresses. NFA 430 is responsible for generating the next indexes and fetch addresses to access all three array structures in trace cache 270. Decoder logic for each cache array uses the "use temporal index bit" from NFA array 430 to select which partition to access. For accessing the conventional trace cache entries, the logic is associated with a mask register, whose value is set by the profile technique to indicate the size. This is used for selecting appropriate index bits from a fetch address since the size changes depending on applications. The temporal indexes are appropriately generated by the profile technique for each application to match with its partition.

In one embodiment, a profile technique implemented during application compiling enables the trace cache 270 mechanism to specify where to store dynamically formed traces for an efficient use of storage. The technique uses a profiling model that simulates a conventional trace cache to identify the dynamic traces and their execution behavior. The profiler then uses a temporal-based placement algorithm to generate an index number for each selected trace.

The index number is attached with the first branch instruction that forms the trace. Each branch ISA is augmented with a temporal trace cache index field. When forming a trace during run-time, the fill unit 260 extracts the index number from the first branch and uses the index number to allocate an entry in the cache 270 arrays. If there is no temporal index found, as in a conventional trace cache, a part of fetch address is used for indexing.

The trace cache 270 array entries can be reconfigured into temporal index entries and conventional entries for each application based on the profiling. In one embodiment, there are two main tasks to complete the process. The first task is to collect profile information on traces that are generated dynamically. The second task is to use the profile information to generate temporal-based indexes of the traces.

In one embodiment, the temporal trace cache entry partition need not be a power of 2 since it is accessed through direct-mapped indexes instead of fetch addresses. Any arbitrary number of entries within the size of the index bits can be added to this partition for better performance.

Referring back to FIG. 4, each cache 270 array includes associated bank enable logic. For instance, bank enable logic 412 is associated with tag array 410, bank enable logic 422 is associated with data array 420, and bank enable logic 432 is associated with NFA array 432. Bank enable logic 412 enables the selection of either bank 0 or bank 1 in order to access the cache arrays.

The size of trace cache 270 may determined during profiling. In one embodiment, a profile mechanism examines performance for an application as the size of trace cache 270 is increased. A profiling model that simulates a conventional trace cache can be used to collect such information. If an application falls into a small size resource category, the profile mechanism generates appropriate size hints to disable banks and entries of the RTC to reduce unnecessary power consumption.

The disable hints can be communicated through an instruction set architecture to a disabling logic in the trace cache 270 before the execution of each application. In one embodiment, trace cache 270 is designed with bank and entry disable logic to take advantage of the profile hints. For example, if the size of the trace cache 270 is 1024-entry arrays and each array is divided into 2 banks, a bank disable hint can be generated to only enable 512-entry arrays. A similar method can be used for reconfiguring the number of entries for each bank of the RTC arrays.

Thus, for smaller applications trace information may be stored in only one bank, enabling the other bank to be disabled. As a result, power may be conserved at trace cache 270. If the application requires larger cache arrays, both banks may be used, with the bank enable logic selecting which bank to access data.

As discussed above, there are two tasks to complete the process (e.g., collect profile information on dynamic traces and generating temporal-based directly-mapped indexes for selected traces). Collecting profile information involves a dynamic sequence of fetched traces from trace cache 270.

Using a profiling model that simulates the trace cache, whenever a trace is fetched from trace cache 270, the trace's fetch address and path information are recorded. This provides the order in which traces are executed during run-time. This is referred to as the dynamic execution sequence of traces.

To identify traces that are frequently executed, dynamic execution count information is collected for each unique trace. Identifying frequently executed traces helps to reduce the number of traces to process by discarding those traces that are seldom executed. This is referred to as unique trace information.

The temporal-based directly-mapped index generation uses the profile information from the task 1 to generate an index number for each selected trace. First unique traces that are frequently executed are selected. This technique uses the dynamic execution count information collected for each unique trace to determine traces that are frequently executed. A simple threshold value is used to discard traces that have lower execution frequencies. In one embodiment, the threshold value is application dependent. The threshold value is set by considering the total percentage of dynamic execution counts covered by the selected unique traces.

Figure 5:
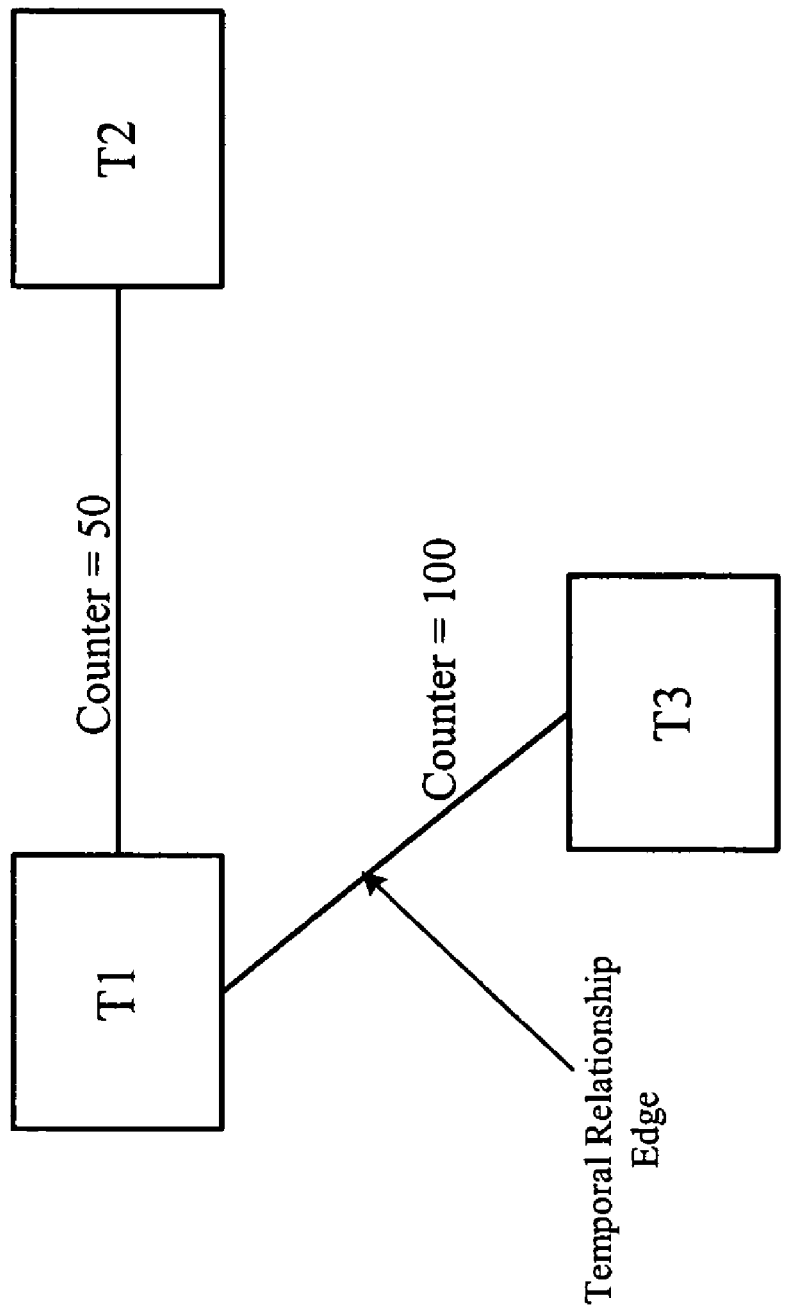
FIG. 5 illustrates one embodiment of a temporal relationships graph.

Next, temporal relationship graphs among the selected unique traces are constructed. The graph is similar to the conflict graph of a graph-coloring-based register allocation technique. FIG. 5 illustrates one embodiment of a temporal relationships graph. Referring to FIG. 5, nodes T1–T3 are shown. Each node in the graph represents a selected unique trace.

Each edge indicates temporal relationship between unique traces. At the beginning, there are no edges between nodes. Edges are added by processing the dynamic execution sequence of traces. Whenever two traces execute in an interleaved manner, an edge is added between the corresponding two nodes. Each edge is associated with a counter. The counter keeps track of the number of times those two traces are interleavingly executed.

The algorithm to generate such a graph can be best described with an example. Consider two unique traces T1 and T2. When processing the dynamic execution sequence of the traces, the sequence of dynamic execution, T1 –>T2 –>T1 is encountered. In other words, T1 is executed first. Subsequently, T2 is executed and T1 is executed again. Thus, the two traces T1 and T2 have a temporal relationship during dynamic execution. This implies that T1 and T2 need to be present in the trace cache during the same time frame.

It is desirable that trace cache 270 allocates separate entries for traces T1 and T2 so that they do not overwrite each other. With this algorithm traces that do not exhibit temporal relationships can also be identified. In the temporal relationship graph these traces do not have an edge between them (e.g., the T2 and T3 case in FIG. 5). For each edge, a counter is added to keep track of the number of times the two traces executed in an interleaved manner.

If the counter value is lower than a threshold, the associated edge may be discarded to reduce the number of temporal relationships. After processing the whole sequence of dynamic execution, the final graph represents the temporal relationships among traces. If there are many edges with counter values above a threshold, it can be concluded that there are many traces that are to have separate entries in the trace cache. Otherwise many trace cache entries can be reused by different traces such that the traces can "fit" into a smaller trace cache and perform as well as a larger trace cache.

A simple method to determine temporal relationships among traces (e.g., traces that are executed in an interleaved manner) is to use time stamps while processing the traces in the order of their dynamic execution. Table 1 shows Time Stamp Method for Temporal Relationships.

TABLE 1

| Unique Traces | Initial Time Stamp Values | Time Stamp Values after executing T1 –> T2 –> T3 | Time Stamp Values after executing T1 –> T2 –> T3 –> T1 |
| --- | --- | --- | --- |
| T1 | 0 | 1 | 1 –> 4 |
| T2 | 0 | 2 | 2 |
| T3 | 0 | 3 | 3 |

Table 1 shows the dynamic execution sequence of the traces, T1–>T2 –>T3 –>T1. To each unique trace, T1, T2, and T3, a time stamp is attached such as a sequence number. All of the time stamps of each unique trace is initialized to 0. In this example, the time stamp for T1 is examined whenever the first execution of T1 is encountered to verify whether T1 has been executed before.

If T1 has not been executed before, the time stamp for T1 is updated to 1. The next executed trace is T2, which is time stamped with 2. Similarly, the trace T3 will have 3 as its time stamp. Subsequently, when trace T1 is again encountered, and before its stamp is updated, it is observed that T1 was executed before and has a time stamp. The current potential time stamp for T1 is 4.

At this time, the T1 time stamp (1) is compared with all time stamps of the unique traces (e.g., T2 and T3 in this case). If the time stamps of the unique traces are higher than the T1 time stamp (1), the unique traces have a temporal relationship with T1. In this example, both T2 and T3 have a temporal relationship with T1. For each identified temporal relationship, an edge is added in between.

As discussed above, FIG. 5 shows an edge between T1 and T2, and another edge between T1 and T3. Also, the counters on each edge are incremented to indicate the repetition of temporal relationships between the traces. The time stamp of T1 is then changed to the current time stamp, 4. This process continues until the end of the dynamic execution sequence of traces is reached.

After the temporal relationship graphs are constructed, a temporal-based index number is assigned to each selected unique trace. This process involves the algorithm assigning a trace cache entry index number to each unique trace based on the temporal relationship graph. In one embodiment, this process is similar to graph-coloring-based register allocation. A stack is used to push the graph nodes. As a node is popped from the stack, graph coloring is performed. The color for each node indicates an index to the trace cache for each unique trace. A detailed description of this process has not been described since one of ordinary skill in the art will appreciate that it is similar to well-known register allocation techniques.

The Reconfigurable Trace Cache described above will enable the reduction of power consumption in future high-end microprocessors. The RTC is designed to reduce significant power consumption for a class of applications that require less resources and improve performance for another class that requires more resources. In addition, the RTC exploits profile hints to guide the reconfiguration of the arrays and indexing mechanism to achieve such a reduction in power and improvement in performance.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as the invention.

What is claimed is:

1. A computer system comprising a microprocessor having a dynamically re-configurable trace cache to provide application specific configuration of the trace cache, the trace cache including:
   a tag array;
   a data array; and
   a next fetch address (NFA) array,
   wherein the tag array, the data array and NFA array each store one or more fetch address entries and one or more temporal address entries.

2. The computer system of claim 1 wherein the microprocessor further comprises:
   a fill unit to form micro-operations; and
   branch prediction logic.

3. The computer system of claim 2 wherein the microprocessor further comprises an execution core to execute the micro-operations.

4. The computer system of claim 1 wherein each trace stored in the trace cache is assigned an index value.

5. The computer system of claim 4 wherein the tag array, the data array and the NFA array each comprise a decoder to access a trace stored in the one or more temporal address entries using an index value.

6. The computer system of claim 1 wherein the one or more temporal address entries are generated by simulating to identify dynamic traces, the execution behavior of the dynamic traces and generating an index value for each identified trace.

7. A microprocessor comprising:
   an instruction cache to receive and store the micro-operations as cache lines; and
   a trace cache, coupled to the instruction cache, that is dynamically re-configurable using profile information to provide application specific configuration of the trace cache, the trace cache including:
      a tag array;
      a data array; and
      a next fetch address (NFA) array,
      wherein the tag array, the data array and NFA array each store one or more fetch address entries and one or more temporal address entries.

8. The microprocessor of claim 7 further comprising:
   a fill unit to form micro-operations; and
   branch prediction logic.

9. The microprocessor of claim 7 wherein the one or more temporal address entries are generated by simulating to identify dynamic traces, the execution behavior of the dynamic traces and generating an index value for each identified trace.

10. The microprocessor of claim 7 further comprising an execution core to execute the micro-operations.

11. The microprocessor of claim 7 wherein each trace stored in the trace cache is assigned an index value.

12. The microprocessor of claim 11 wherein the tag array, the data array and the NFA array each comprise a decoder to access a trace stored in the one or more temporal address entries using an index value.

13. A trace cache comprising:
    a tag array;
    a data array; and
    a next fetch address (NFA) array;
    wherein the tag array, the data array and NFA array each store one or more fetch address entries and one or more temporal address entries.

14. The trace cache of claim 13 wherein each trace stored in the trace cache is assigned an index value.

15. The trace cache of claim 14 wherein the tag array, the data array and the NFA array each comprise a decoder to access a trace stored in the one or more temporal address entries using an index value.

16. The trace cache microprocessor of claim 13 wherein the one or more temporal address entries are generated by simulating to identify dynamic traces, the execution behavior of the dynamic traces and generating an index value for each identified trace.

17. A computer system comprising:
    a microprocessor having a dynamically re-configurable trace cache to provide application specific configuration of the trace cache, the trace cache including:
       a tag array;
       a data array; and
       a next fetch address (NFA) array,
       wherein the tag array, the data array and NFA array each store one or more fetch address entries and one or more temporal address entries;
    a chipset coupled to microprocessor; and
    a main memory coupled to the chipset.

18. The computer system of claim 17 wherein each trace stored in the trace cache is assigned an index value.

19. The computer system of claim 18 wherein the tag array, the data array and the NFA array each comprise a decoder to access a trace stored in the one or more temporal address entries using an index value.

* * * * *